United States Patent [19]

van Mil

[11] 4,439,891

[45] Apr. 3, 1984

[54] DEVICE FOR DIVIDING SLAUGHTERED POULTRY

[75] Inventor: Martinus P. G. van Mil, Boxmeer, Netherlands

[73] Assignee: Stork PMT B.V., Netherlands

[21] Appl. No.: 381,422

[22] Filed: May 24, 1982

[30] Foreign Application Priority Data

Jun. 17, 1981 [NL] Netherlands .................. 8102919

[51] Int. Cl.³ .......................................... A22C 21/00
[52] U.S. Cl. ............................................. 17/11; 17/52
[58] Field of Search ..................................... 17/11, 52

[56] References Cited

U.S. PATENT DOCUMENTS

3,639,945  2/1972  Duncan et al. ................ 17/52 X
4,251,901  2/1981  Thomas et al. ............... 17/11.1 X
4,270,243  6/1981  Lewis ............................. 17/11

Primary Examiner—Willie G. Abercrombie
Attorney, Agent, or Firm—Newton, Hopkins & Ormsby

[57] ABSTRACT

A device for dividing slaughtered poultry, comprising a stationary elongate conveyor member situated above a positioning member, and transporting the bird suspended by its legs, and with a guide member having a guide surface situated beneath the positioning member and symmetrical with respect thereto, and comprising an upwardly sloping part in front of the positioning member with a central wedge-shaped positioning groove for the bird's breast and a substantially flat part beneath the positioning member through which the cutting means extends.

8 Claims, 13 Drawing Figures

DEVICE FOR DIVIDING SLAUGHTERED POULTRY

BACKGROUND OF THE INVENTION

1. Field of the invention

This invention relates to a device for longitudinally dividing slaughtered poultry, comprising a conveyor means for the poultry for bringing it on to a stationary elongate positioning member co-operating with a guide member and a cutting member.

2. Description of the Prior Art

A device of this kind is described in U.S. Pat. No. 3,731,344. In this known device the conveyor is formed by a number of trays which are coupled to a circulating conveyor chain and which each receive a bird lying loosely therein and convey the same to the positioning member above which there is disposed a second endless toothed conveyor chain for further conveyance of the bird, which passes a number of cutter means extending in the direction of conveyance and intended for longitudinally cutting off parts of the bird.

Purchasers of poultry, and particularly chickens, are today showing an increasing demand for specific parts of the bird, particularly halves or quarters (breast quarters and leg quarters). There is accordingly a need for a device by means of which a bird can be divided into such portions, i.e. longitudinally into two identical halves—each consisting of a leg and breast portion—and preferably also for the subsequent transverse division of these halves into a breast quarter on the one hand and a leg quarter on the other.

SUMMARY OF THE INVENTION

It is primarily an object of the invention to provide a device by means of which this operation can be carried out rapidly and accurately.

According to the invention, the conveyor member situated above the positioning member transports the bird suspended by its legs, and the guide member is formed by a guide surface situated beneath the positioning member and symmetrical with respect thereto, said guide surface having an upwardly sloping part which is situated in front of the positioning member and which is provided with a central wedge-shaped groove for the bird's breast, and a substantially flat party situated beneath the positioning member and having the cutting means extending therethrough, said substantially flat part being followed by a downwardly sloping part.

By means of the elongate positioning member in co-operation with the guide member, the bird suspended by its legs is so accurately positioned with respect to the cutter member that cutting is effected substantially exactly along the longitudinal plane of symmetry of the bird, resulting in two identical halves.

The guide member construction is preferably such that the upwardly sloping part is made up of a first upwardly sloping plate at a small angle to the direction of conveyance, followed by three subsequent plates of which the first slopes steeply and the last forms a small angle with the direction of conveyance.

In one preferred embodiment, the positioning member is formed by two guide rods which extend symmetrically with respect to its longitudinal axis and which, as considered from the entry end, are situated adjacent one another and are bent dish-shaped in a first part, then diverge at a small angle in a part which is also directed downwardly towards the guide member at a small angle to the direction of conveyance and then extend substantially parallel to one another in an end part which is partly at a small angle to the guide surface and partly substantially parallel to the direction of conveyance of the poultry.

The invention further aims to provide a device in which each half can be divided into a breast quarter and a leg quarter. To this end the invention uses two transverse cutter members which are disposed transversely of the direction of cutting of the longitudinal cutting member at the end of the positioning member and symmetrically with respect thereto, said transverse cutting members being disposed beneath a guide plate which has a central recess and which, as considered in the direction of conveyance of the poultry, consists of an upwardly sloping part and a flat part and co-operates with two rod-shaped guides which define the longitudinal edges of the recess and converge in the direction of conveyance, the entry opening being beneath the downwardly sloping part of the positioning member and, as considered in the direction of conveyance of the poultry, consisting of a part parallel thereto and a part sloping upwardly together with the guide plate, the whole arrangement being so situated that the end of the positioning member is level with the central recess.

As a result of these steps, the division of a half into a leg quarter and a breast quarter respectively is so effected that no rib parts or breast flesh is present on the leg quarter.

Preferably, the positioning member bears downwardly projecting elongate guide plates along its divergent and parallel part, so that good guidance is obtained for the wings during the movement of the parts of the poultry through the device.

Preferably, the conveyor means are formed by conveyor chains coupled to pusher elements acting on the bird's legs and two pairs of guide rods which extend in the direction of conveyance and between which the bird's legs are clamped.

The invention furthermore provides a device which can readily be changed over from a mode of operation in which the birds introduced are divided only into two halves, to a mode of operation in which the resulting halves are again divided transversely into quarters. To this end the invention proposes to place an outwardly pivotable part in one of each pair of guides in a position situated between the respective first and second cutting means, said pivotable part being pivotable outwardly to an extent such that a bird's leg guided between the guide rods is released.

When the pivotable part is pivoted outwardly, the halves are released from the guide before they reach the transverse cutters and the devices thus yields half-birds; when the guide is in the closed position, the halves are conveyed on and the device yields quarters.

Preferably, the cutting means are cutter blades driven with a rotary action.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE PREFERRED EMBODIMENTS

The device having the general reference 1 comprises the frame 2 resting on casters 3, which make the device readily transportable so that it can be added to a production line in any required position.

Figure 9:
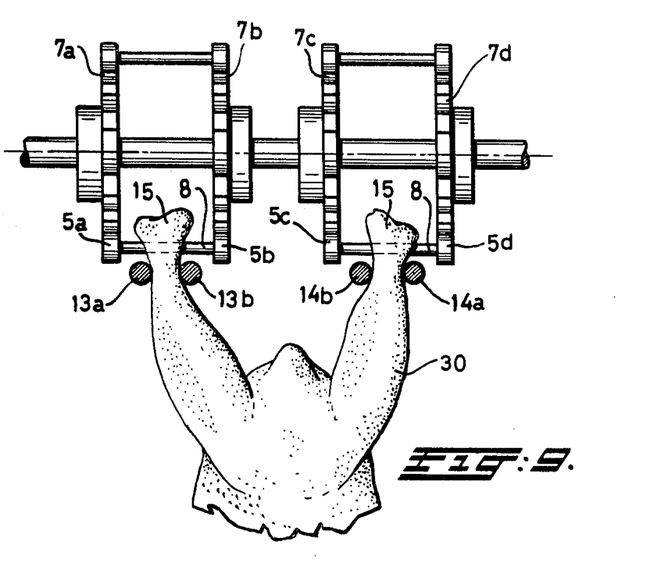
FIG. 9 is a diagrammatic end elevation of the conveyor members.

The birds for processing are introduced into the device at the inlet 4 and are moved through the device by the conveyor chains 5a–5d which are trained over the chain wheels 6a–6d and 7a–7d and are interconnected by pushers 8 acting on the chicken's legs. The respective chain wheels are mounted on a common spindle 9 and 10 respectively and spindle 9 is driven by the diagrammatically illustrated drive 11 with the drive chain 12. The chains extend above two pairs of guide rods 13a and 13b; 14a and 14b respectively, between which the bird's legs 15 are clamped as shown in FIG. 9. Four rollers 16a–16d are disposed above the chains.

Figure 1:
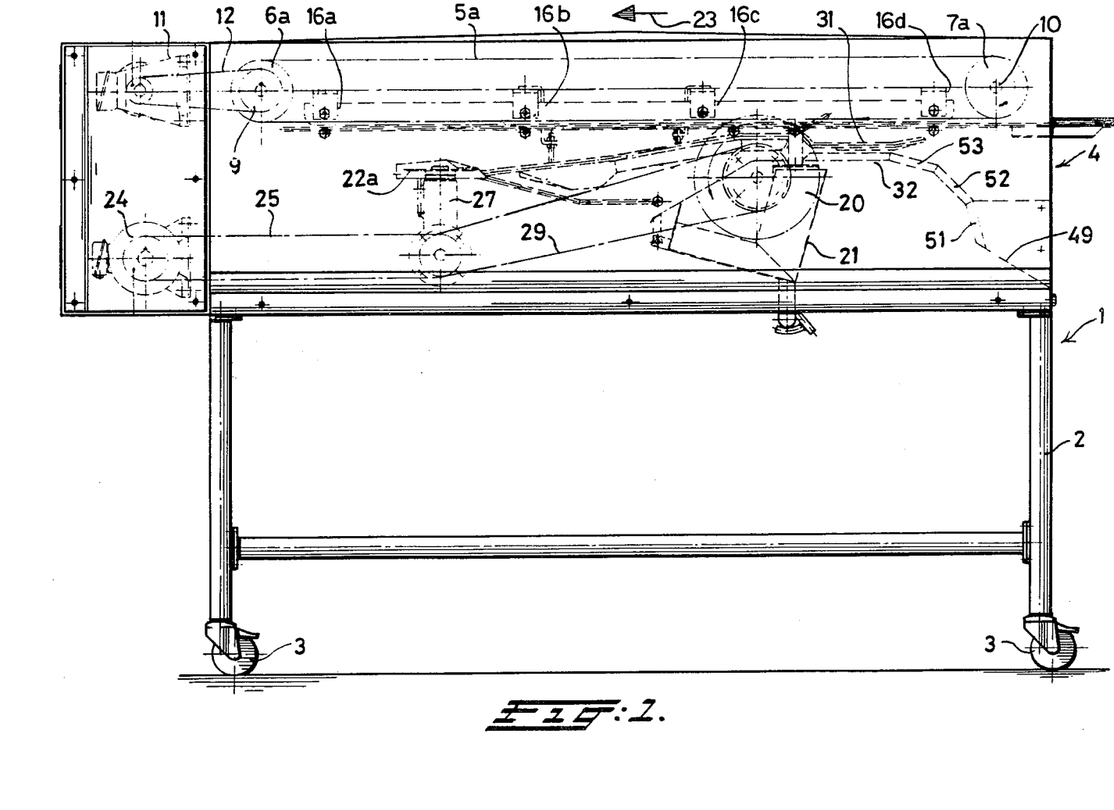
FIG. 1 is a side elevation of a complete device according to the invention.
Figure 2:
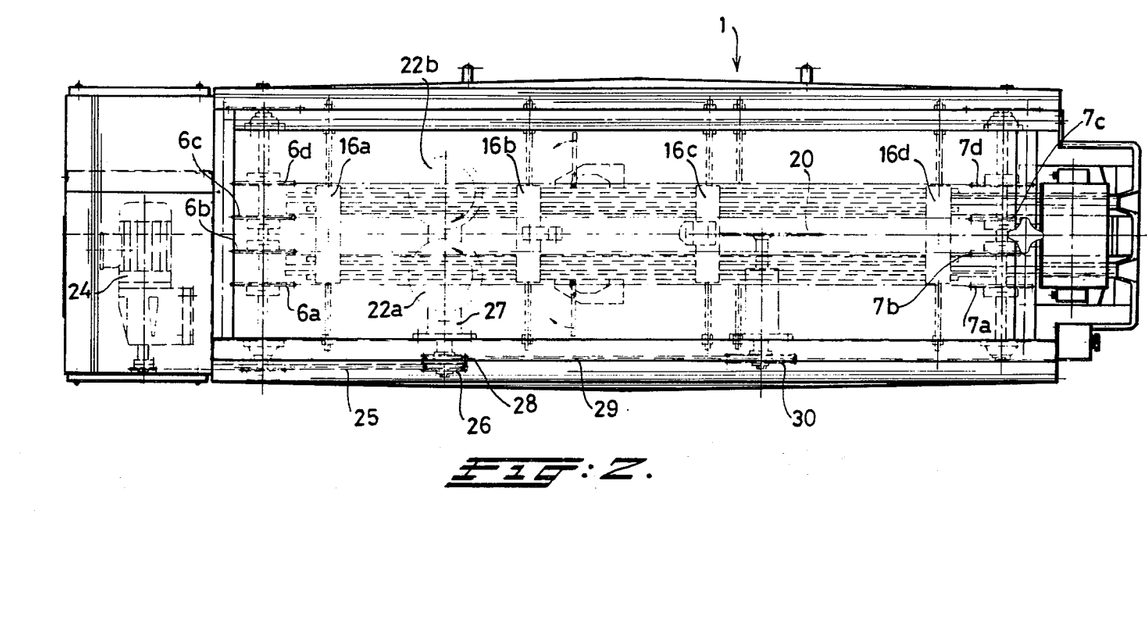
FIG. 2 is a top plan view of this device.
Figure 3:
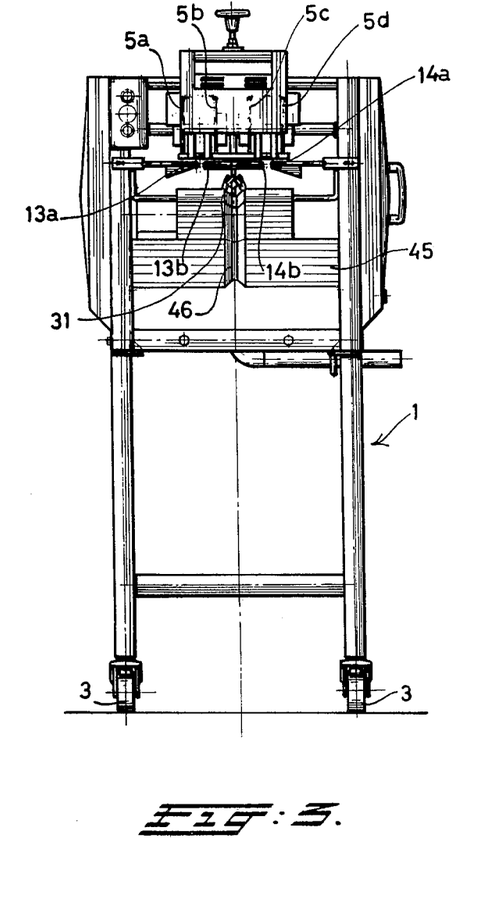
FIG. 3 is an end elevation thereof.
Figure 10:
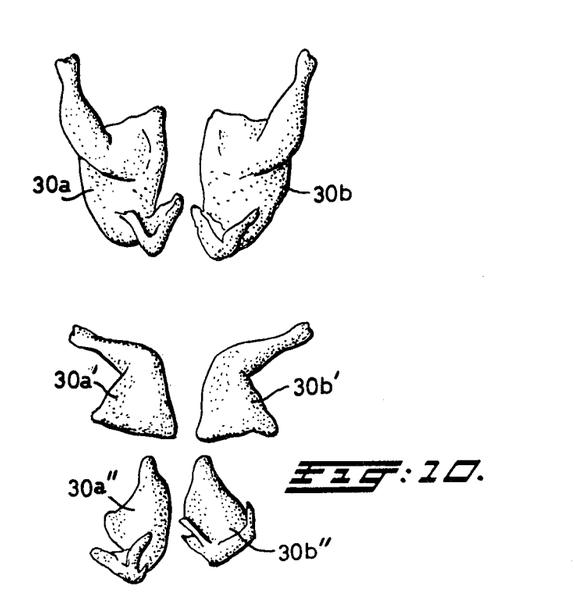
FIG. 10 shows the parts in which a bird can be divided by means of the device according to the invention.
Figure 11:
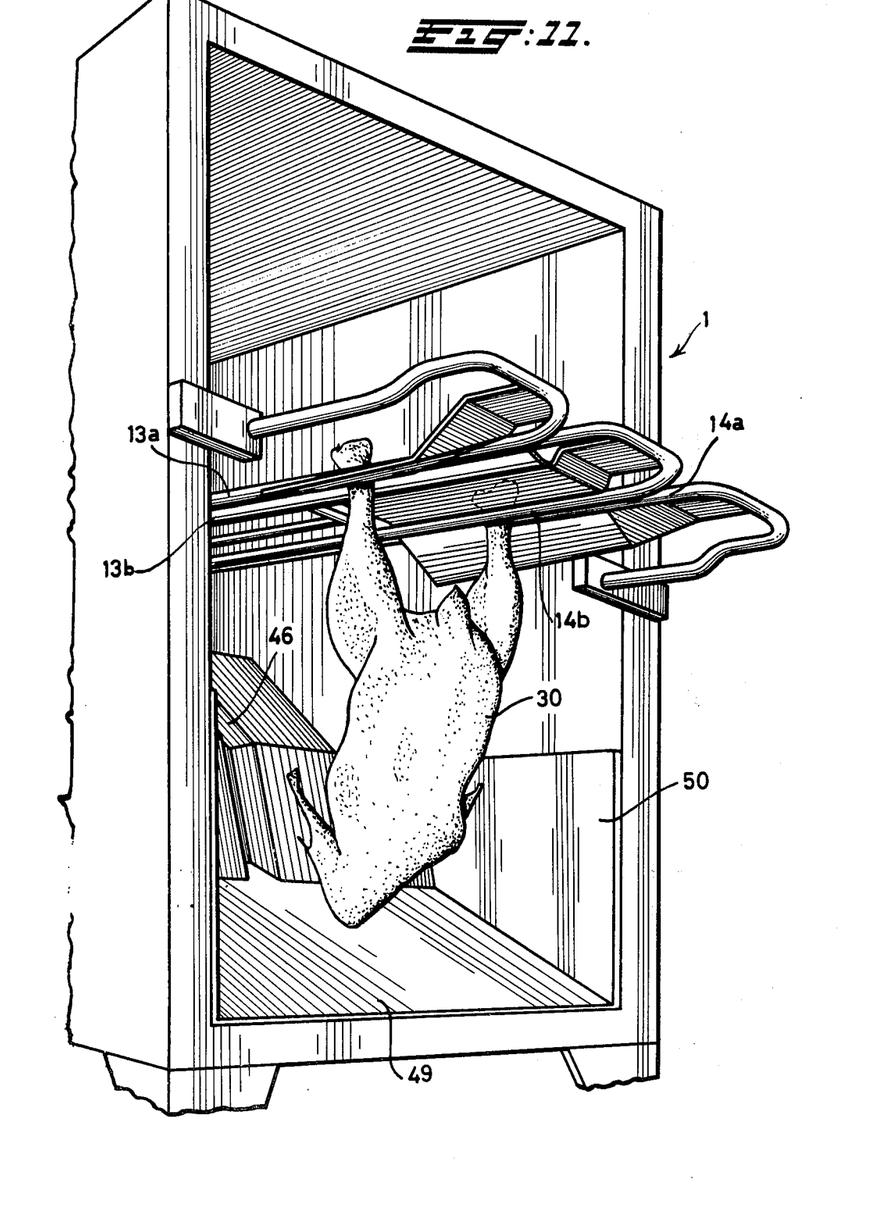
FIG. 11 is a diagrammatic illustration showing the introduction of a bird into the device.

The main parts of the device are disposed below the level of the chains and guides forming the bird conveyor means. They comprise a cutter blade 20 rotating in a vertical plane and surrounded by a guard 21, and two horizontal smaller transverse cutter blades 22a, 22b after blade 20 in the direction of movement of the poultry (indicated by arrow 23). These blades are driven (see FIG. 2) by the drive motor 24, which drives the gearbox 27 to the blades 22a, 22b via the chain 25 and gearwheel 26, and blade 20 via gearwheel 28, chain 29, and gearwheel 30. Blade 20 is used for longitudinally cutting the chicken into two halves and blades 22a, 22b for the transverse cutting of a half into two quarters. FIG. 9 shows the resulting products: the longitudinal cutting causes a bird introduced into the device (see FIG. 10) to be divided into two halves 30a, 30b while the longitudinal cutting operation divides each half into two to form leg quarters 30a', 30b' and breast quarters 30a" and 30b". This division of the bird must be exactly symmetrical with respect to the longitudinal plane and be effected through a predetermined dividing line in the transverse direction, and it is particularly important that the leg quarters should not contain any ribs or breast flesh. Special guide and positioning means are provided to this end.

Figure 7A:
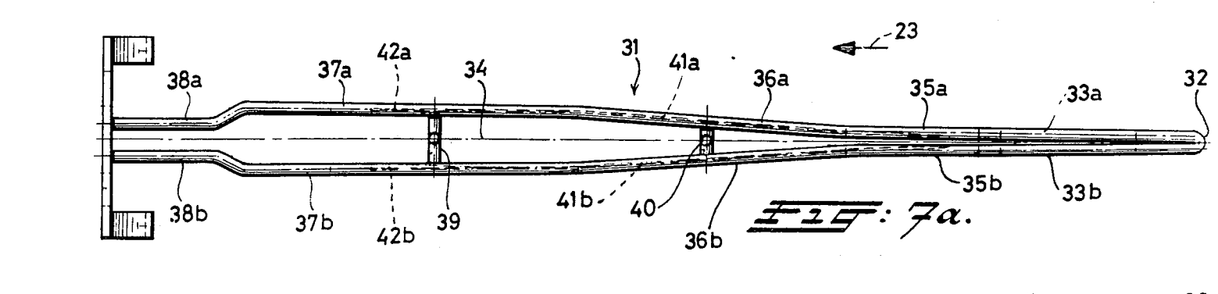
FIG. 7a is a top plan view of the positioning member.
Figure 7B:
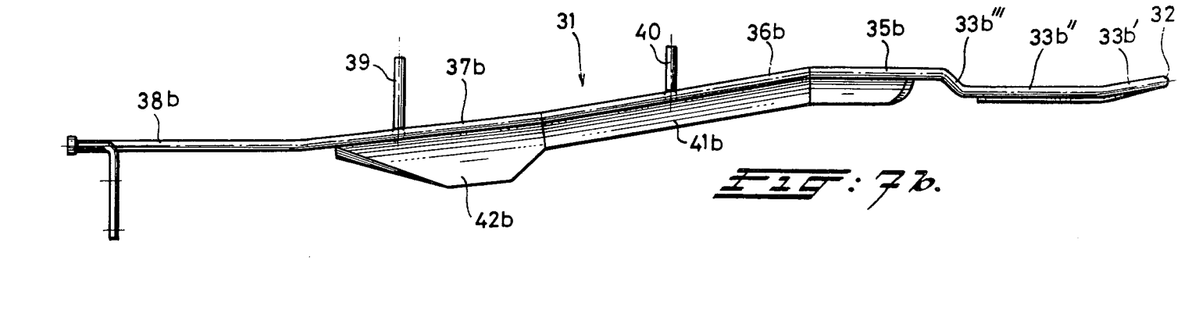
FIG. 7b is a side elevation of this member.

The guide and positioning means co-operating with the blade 20 comprise an elongate positioning member denoted by the general reference 31 and illustrated in detail in FIGS. 7a and 7b. It co-operates with a plate-shaped guide member situated therebeneath, the shape of which is shown more particularly in FIG. 4. When the bird 30 is introduced into the deivce with the legs clamped between the guide rods 13a, 13b, 14a, 14b and is conveyed by the conveyor chains 5a–5d, the bird is oriented with the breast downwards and with the abdominal opening extending forwardly on the elongate positioning member 31. The latter consists of a rod bent double symmetrically with respect to its longitudinal axis and bent as follows in the conveying direction indicated by arrow 23:

Starting from point 32, two adjacent parts 33a, 33b are bent with a dished shape as considered transversely of the longitudinal plane of symmetry passing through the longitudinal axis 34, this section comprising the parts 33a', 33a", 33a'''; 33b', 33b", 33b''' respectively. This is followed by a straight section 35a, 35b continuing in the divergent parts 36a, 36b which extend obliquely downwards with respect to the conveying direction. This section is followed by a part 37a, 37b, consisting of substantially parallel rod parts terminating in end parts 38a, 38b. The complete member is suspended by the yokes 39, 40.

The positioning member 31 also bears elongate guide surfaces 41a, 41b which extend downwardly and the front parts 41a, 42b of which are made deeper than the beginning parts.

Figure 4:
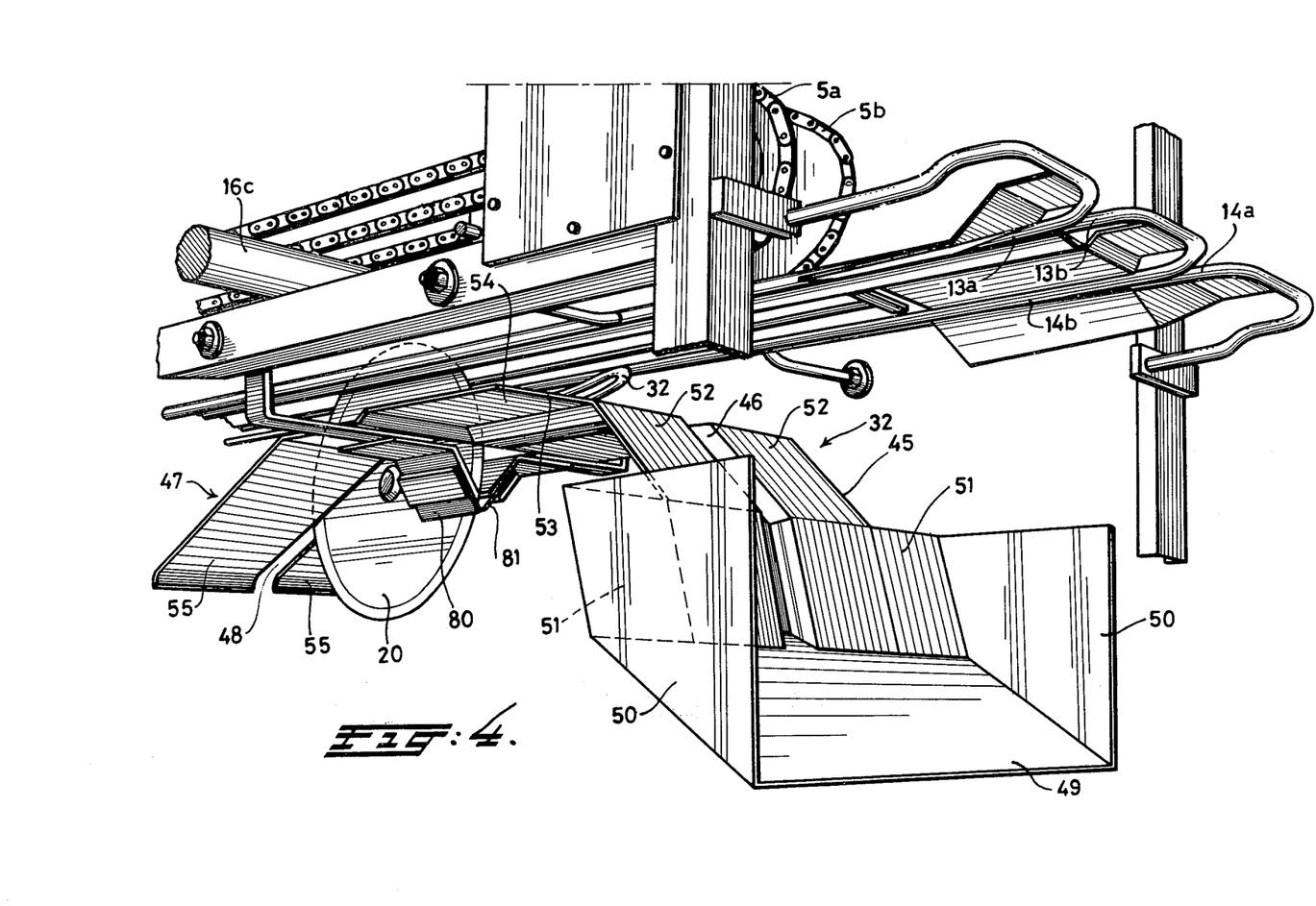
FIG. 4 is an enlarged-scale view of the entry end of the device according to the invention with the first cutter member.

The guide member 45 co-operating with this positioning member 31 is also shaped in a very special way. It is symmetrical with respect to the longitudinal central plane and its first part is provided with a central guide groove 46, which accomodates the bird's breast during its movement; the last part has a central slot 47 through which the blade 20 projects. The first part 45 consists of the flat guide plate 49 secured to the side plates 50, by means of which the complete member is secured in the frame of the device 1 and guide plate 49 continues in the plates 51 which are at a fairly small angle to the vertical. This is then followed by the plates 52, which include a smaller angle to the vertical and they in turn continue in the form of the plates 53 which extend substantially horizontally. This is followed by a horizontally extending part 54 followed by the obliquely downwardly extending plates 55, which are separated by the slot 48 and together form the outlet part 47. The above-described form of the elongate positioning member 31 in combination with the guide plates 51-55 ensures such accurate positioning of the bird that the blade 20 cuts the bird exactly along the longitudinal central plane resulting in the two halves 30a, 30b shown in FIG. 9.

Figure 6:
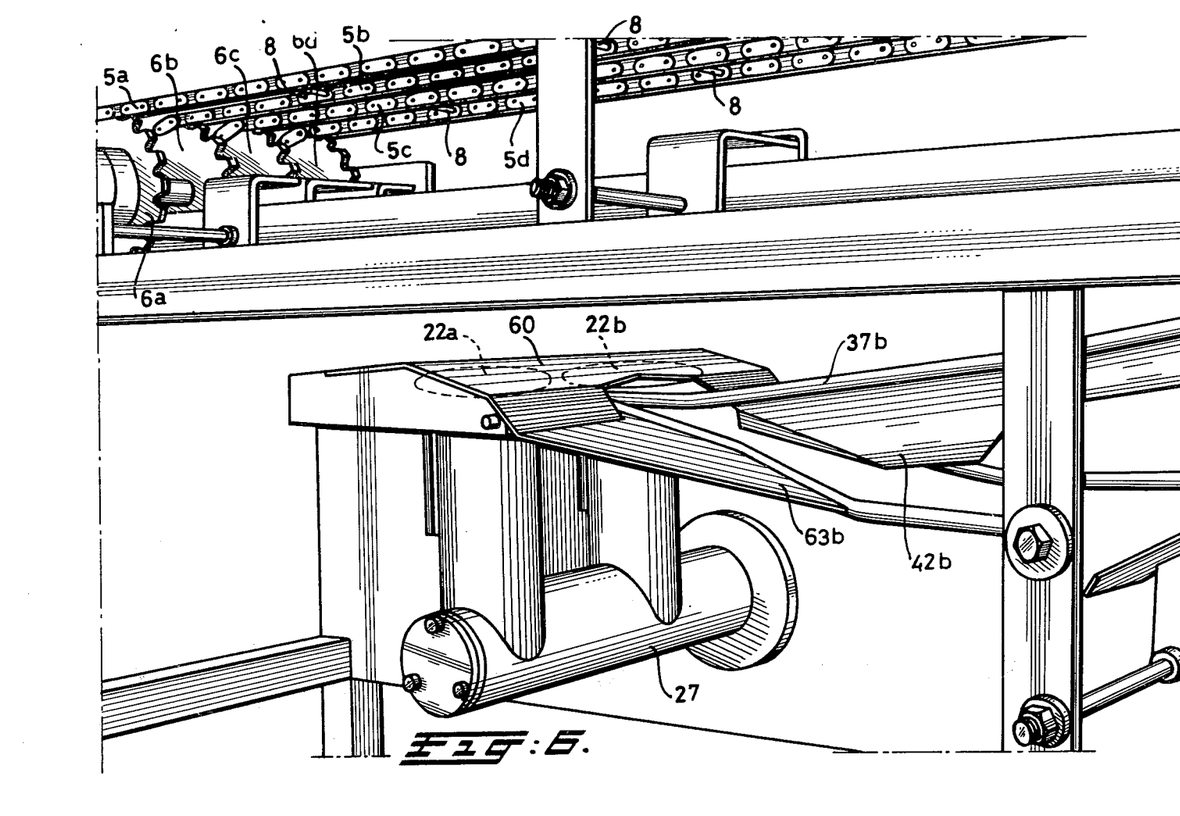
FIG. 6 shows in detail the two transverse cutters with the associated guide and positioning members.
Figure 8A:
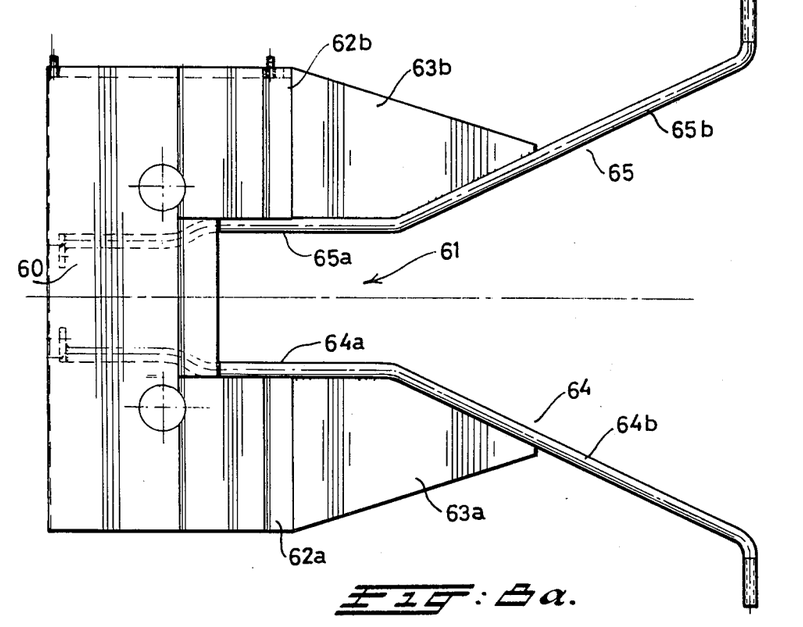
FIG. 8a is a top plan view of the guide members co-operating with the transverse cutters.
Figure 8B:
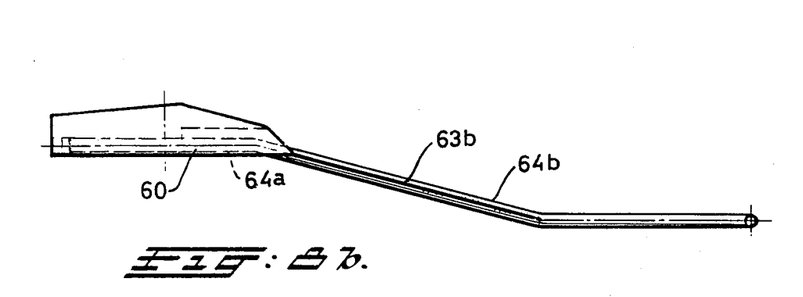
FIG. 8b is a side elevation of these guide members.

When the device is intended solely to divide the poultry into two longitudinally, the above-described elements are sufficient; the device according to the invention is, however, also suitable for subsequently again dividing the poultry transversely, for which purpose the rotating transverse blades 22a, 22b and associated guides are provided. The latter are constructed as follows:

A roof-shaped top plate 60 with a central opening 61; plate 60 continues into the sloping guide plates 63a, 63b via a transitional portion 62a, 62b at an angle of 45° to the direction of conveyance. The edges of the opening 61 are bounded by the guide rods 64, 65, of which the parts 64a, 65a are parallel to one another while the parts 65a, 65b converge in the direction of conveyance of the bird. In combination with the outlet portion 37a, 37b of the positioning member 31, good guidance of the bird is obtained, the bird's wings abutting the plates 63a, 63b and thus remaining outside the cutting range of the rotating blades 22a, 22b.

Figure 5:
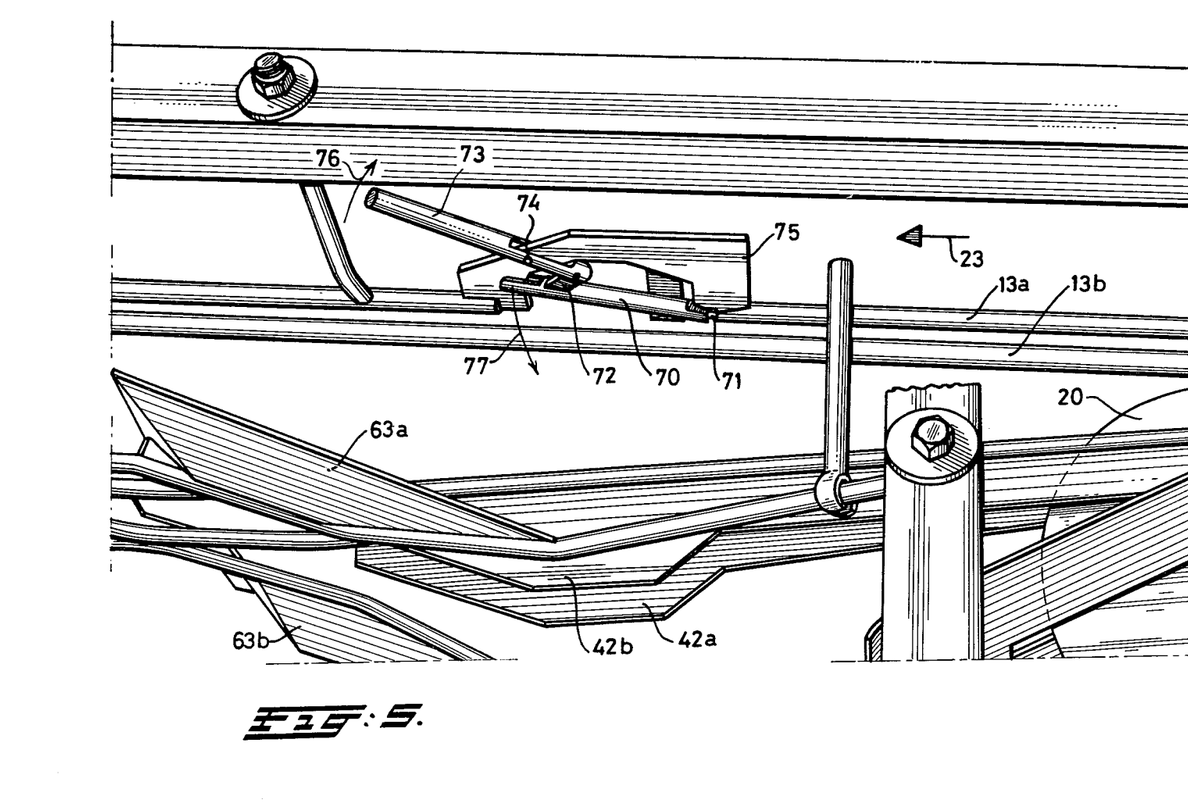
FIG. 5 shows the part of the bird positioning and guide members between the first and the two transverse cutter members.

As already explained hereinbefore, the device according to the invention is suitable for cutting a bird just longitudinally and also for again dividing the resulting halves transversely. If the bird is required only to be cut into two halves, the two halves must be removed from the device before they reach the transverse blades 22a, 22b and to this end, according to the invention part of the guides is so constructed that the poultry halves are released before reaching the transverse cutters. FIG. 5 shows the construction used for this purpose. Guide 13a contains a part 70 pivotally disposed therein and rotatable about pivot 71 and coupled, via a pivotable link 72 to the operating lever 73 which is secured to the bearer plate 75 so as to rotate about pivot 74; plate 75 is secured on the guide 13a. In the position illustrated, the guide 13a is interrupted and a poultry half conveyed in the direction of arrow 23 along the guide will fall out of the same at this interruption; when lever 73 is pivoted in the direction of arrow 76, part 70 moves in the direction of arrow 77 so that the interruption to the guide 13a is eliminated and the poultry half passes through the removal station. By simply changing the position of the operating levers 73 provided on either side, the device can very rapidly be switched from operation in which the bird is divided only into halves to operation in which these halves can also be divided transversely into quarters.

The blades 20, 22a, 22b can be provided with scrapers for the removal of flesh and bone residues as illustrated at 80 and 81 respectively in the case of blade 20.

The main parts of the device according to the invention have been described hereinabove. The drive for the various elements is indicated only diagrammatically and is not explained in detail; the practical embodiment thereof will not cause any problems to those versed in the art.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A device for longitudinally slaughtered poultry, comprising a conveyor means for the poultry for bringing it on to a stationary elongate positioning member co-operating with a guide member and a cutting member, characterized in that the conveyor member situated above the positioning member transports the bird suspended by its legs, and the guide member is formed by a guide surface situated beneath the positioning member and symmetrical with respect thereto, said guide surface having an upwardly sloping part which is situated in front of the positioning member and which is provided with a central wedge-shaped positioning groove for the bird's breast, and a substantially flat part situated beneath the postioning member and having the cutting means extending therethrough, said substantially flat part being followed by a downwardly sloping part.

2. A device according to claim 1, characterized in that the upwardly sloping part is made up of a first upwardly sloping plate at a small angle to the direction of conveyance, followed by three subsequent plates of which the first slopes steeply and the last forms a small angle with the direction of conveyance.

3. A device according to claim 1, characterized in that the positioning member is formed by two guide rods which extend symmetrically with respect to its longitudinal axis and which, as considered from the entry end, are situated adjacent one another and are bent dish-shaped in a first part, then diverge at a small angle in a part which is also directed downwardly towards the guide member at a small angle to the direction of conveyance, and they extend substantially parallel to one another in an end part which is partly at a small angle to the guide surface and partly substantially parallel to the direction of conveyance of the poultry.

4. A device according to claim 1, characterized by two transverse cutter members which are disposed transversely of the direction of cutting of the longitudinal cutting member at the end of the positioning member and symmetrically with respect thereto, said transverse cutting members being disposed beneath a guide plate which has a central recess and which, as considered in the direction of conveyance of the poultry, consists of an upwardly sloping part and a flat part and a co-operates with two rod-shaped guides which define the longitudinal edges of the recess and converge in the direction of conveyance, the entry opening being beneath the downwardly sloping part of the positioning member and, as considered in the direction of conveyance of the poultry, consisting of a part parallel thereto and a part sloping upwardly together with the guide plate, the whole arrangement being so situated that the end of the positioning member is level with the central recess.

5. A device according to claim 4, characterized in that the positioning member bears downwardly projecting elongate guide plates along its divergent and parallel part.

6. A device according to claim 1, characterized in that the conveyor means are formed by conveyor chains coupled to pusher elements acting on the bird's legs and two pairs of guide rods which extend in the direction of conveyance and between which the bird's legs are clamped.

7. A device according to claim 6, characterized in that an outwardly pivotable part is disposed in one of each pair of guides in a position situated between the respective first and second cutting means, said pivotable part being pivotable outwardly to an extent such that a bird's leg guided between the guide rods is released.

8. A device according to claim 1, characterized in that the cutting means are cutter blades driven with a rotary action.

* * * * *